July 28, 1970 R. A. SICHO 3,521,975
CONTROL APPARATUS FOR A MOTOR-DRIVEN COMPRESSOR SYSTEM
ADAPTED FOR USE IN SPRAY APPARATUS
Filed Feb. 7, 1968 3 Sheets-Sheet 1

INVENTOR.
Roman A. Sicho

BY

Marn & Jangarathis
ATTORNEYS

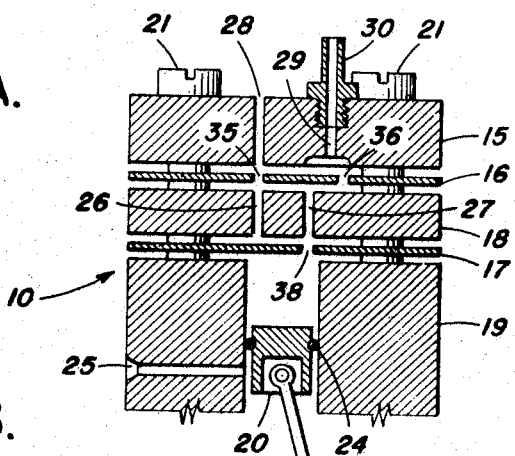
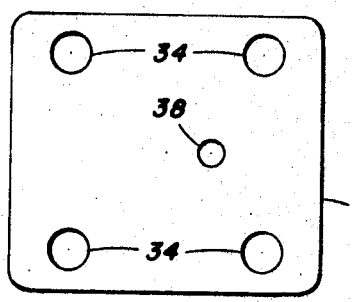
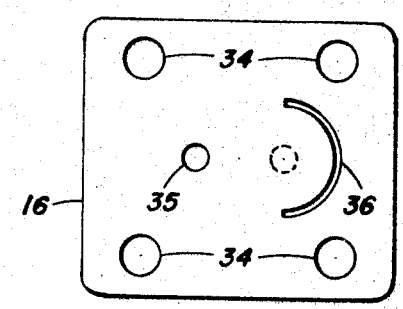
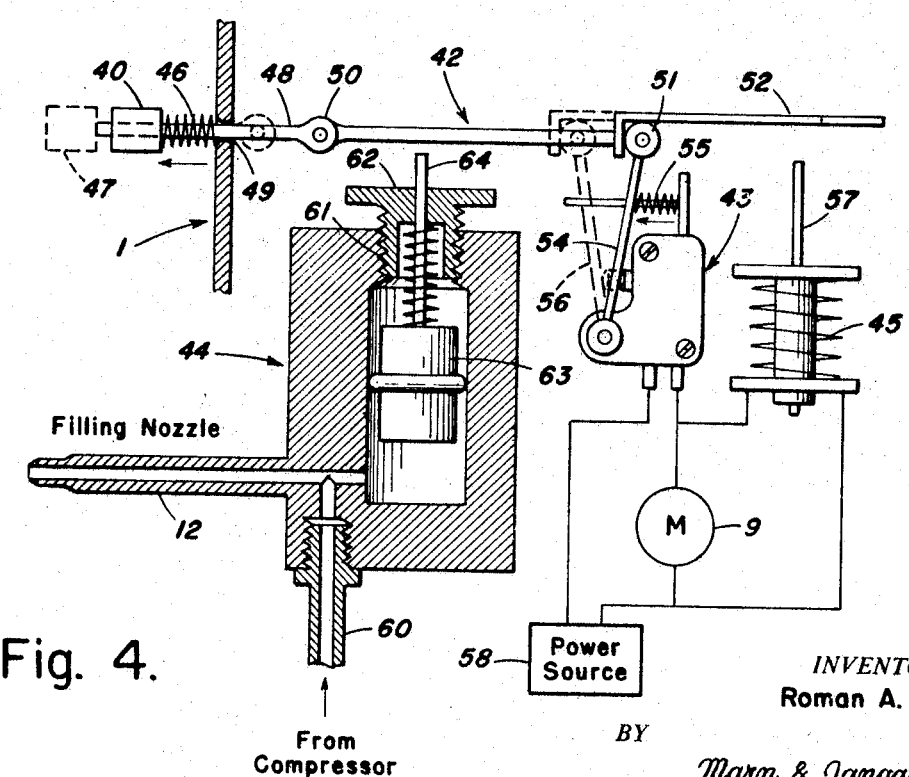

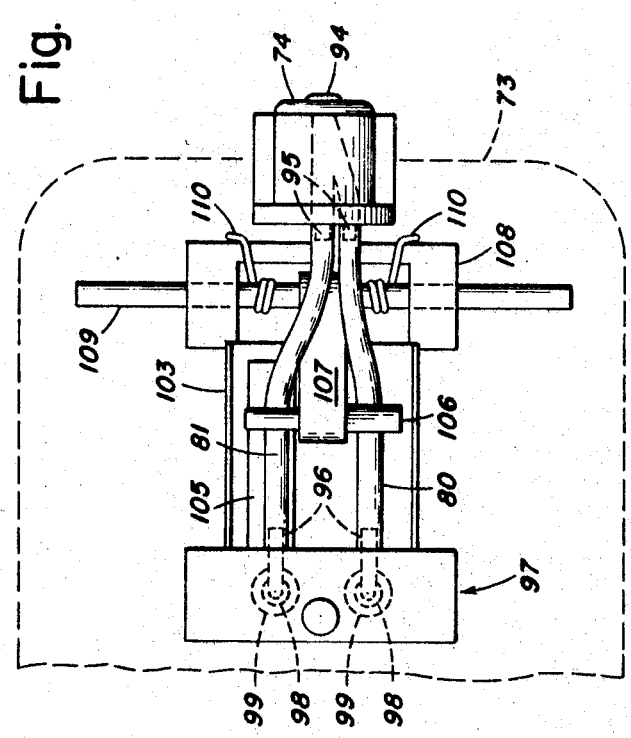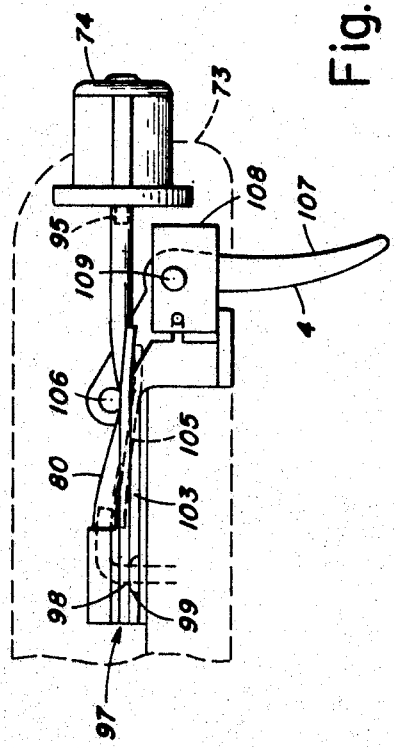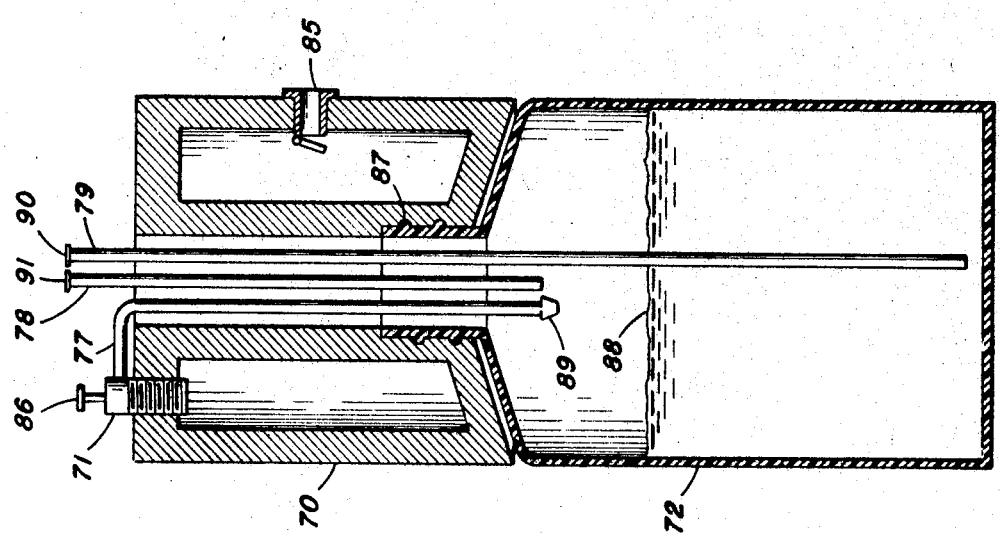

United States Patent Office 3,521,975
Patented July 28, 1970

3,521,975
CONTROL APPARATUS FOR A MOTOR-DRIVEN COMPRESSOR SYSTEM ADAPTED FOR USE IN SPRAY APPARATUS
Roman A. Sicho, Petersburg, N.Y., assignor to
E. C. Smith, Jr., Lexington, N.C.
Filed Feb. 7, 1968, Ser. No. 703,697
Int. Cl. F04b 35/04; G02h 7/08
U.S. Cl. 417—17   5 Claims

ABSTRACT OF THE DISCLOSURE

Control apparatus for a motor-driven compressor system adapted for use in spray apparatus is provided in accordance with the teachings of the present invention. The control apparatus according to the present invention includes motor actuating means, ratchet arms means, switch means and sensing means. The motor actuating means has first and second portions wherein the first portion is adapted to be depressed to thereby energize a motor. The ratchet arm means has an engaging portion thereon and is pivotally connected to the second portion of the motor actuating means. The switch means is connected to energize the motor and includes an enabling arm for controlling the state thereof. The engaging portion of the ratchet arm means is operable to engage the enabling arm of the switch means when the motor actuating means is depressed to close the switch and energize the motor. The sensing means is positioned in an operative relationship with the ratchet means and is responsive to the detection of a selected condition to disengage the ratchet arm means and the enabling arm to thus open said switch.

---

This invention relates to pressure spray devices and more particularly to a spray device which is light, convenient, small in size, adapted to be hand-held and is useful for the spraying of hair solutions, odorants, deodorants, disinfectant materials, and the like.

The application of odorants, deodorants, disinfectant materials, and particularly women's hair spray solutions has for a long time been most conveniently accomplished via the utilization of pressure spray devices, the most popular of which is the aerosol container. The popularity of the aerosol container springs primarily from its characteristics of being a self-contained, self-powered unit which can be brought directly to the point of application without the necessity of trailing connecting tubes therefrom, which tubes normally connect to the reservoirs containing the fluid to be sprayed and to wall-mounted compressor units. However, such aersol containers have, in the past, proved impractical in commercial application because they are extremely expensive in comparison to the bulk purchase of the fluid to be sprayed. Furthermore, even when their extremely expensive nature was tolerated for the sake of convenience, the relatively large storage area necessitated by large numbers of these containers normally prevented economical, large scale purchases.

When economy dictated the use of the wall-mounted unit together with the incumbent trailing of the fluid and other pressurized lines connected to the spray device, in addition to the inconvenience present, clogging within the spray device was often found to be present. This clogging within the spray device was caused both by residue remaining in the nozzle from prior use of the device and the general incompatability of such devices with a plurality of fluids to be sprayed when such fluids differed substantially in viscosity.

Therefore, it is an object of this invention to provide a hand-held spray device and an associated charging stand, which spray device is removable from said charging stand and is completely self-contained, self-powered, and compatable with fluids of varying viscosity which may be purchased in bulk; and which charging stand comprises mechanically simple yet highly effective charging means and controlling means.

Various other objects and advantages of the invention will become clear from the following detailed description of an embodiment therof, and novel features will be particularly pointed out in conjunction with the appended claims.

In accordance with the invention, a spray device charging stand is provided, comprising control means, motor means and compressor mean; in combination with a hand-held spray device comprising nozzle means adapted to be replaceable and interchangeable, control means, a fluid container which is fillable from bulk stores of various fluids, and a high pressure air storage tank together with pressure reducing means. Furthermore, in accordance with this invention, a positive acting, simple yet highly efficient compressor means is provided comprising piston and cylinder means, spacer means, head means, and a plurality of reed valve means, one of said reed valve means having a single flow aperture therein, which single aperture is utilized both in the charging and exhausting of the cylinder. In addition, in accordance with this invention, a control and safety means for the compressor means is provided comprising motor actuating means, pivotally mounted ratchet arm means having an engaging portion thereon, switch means having an enabling arm provided with an engageable portion thereon, and sensing means adapted to break the engagement between said ratchet means and said enabling arm means in response to a selected condition. Furthermore, in accordance with this invention, a replaceable, interchangeable nozzle fitting is provided for said hand spray device comprising first and second sealing washers mounted on the spray device air line and fluid line, respectively; spray nozzle means connected to an air tube and a fluid tube; manifold means having first and second receiving means therein and first and second connecting portions thereon, said first and second receiving means being adapted to form a press fit with said first and second sealing washers, said first and second connecting portions being connected to the other ends of said air and fluid tubes; whereby said manifold means, said air tube, said fluid tube and said spray nozzle means constitute a readily replaceable and interchangeable nozzle fitting which, via said press fit, may be readily mounted in and removed from said spray device.

The invention will be more clearly understood by reference to the following detailed description thereof in conjunction with the accompanying drawing, in which:

FIG. 3A is a diagrammatic view, partially in section, of the compressor means, while FIGS. 3B and 3C show the reed valve therein;

FIG. 4 is a diagrammatic view, partially in section, of the mechanical and electrical control and safety apparatus which is mounted within the spray device charging stand;

FIG. 5 is a partial diagrammatic view, partially in section, of the hand-held spray device; and FIGS. 6A and 6B are top and side views, respectively, of the nozzle and the sprayer control means.

Figure 1:
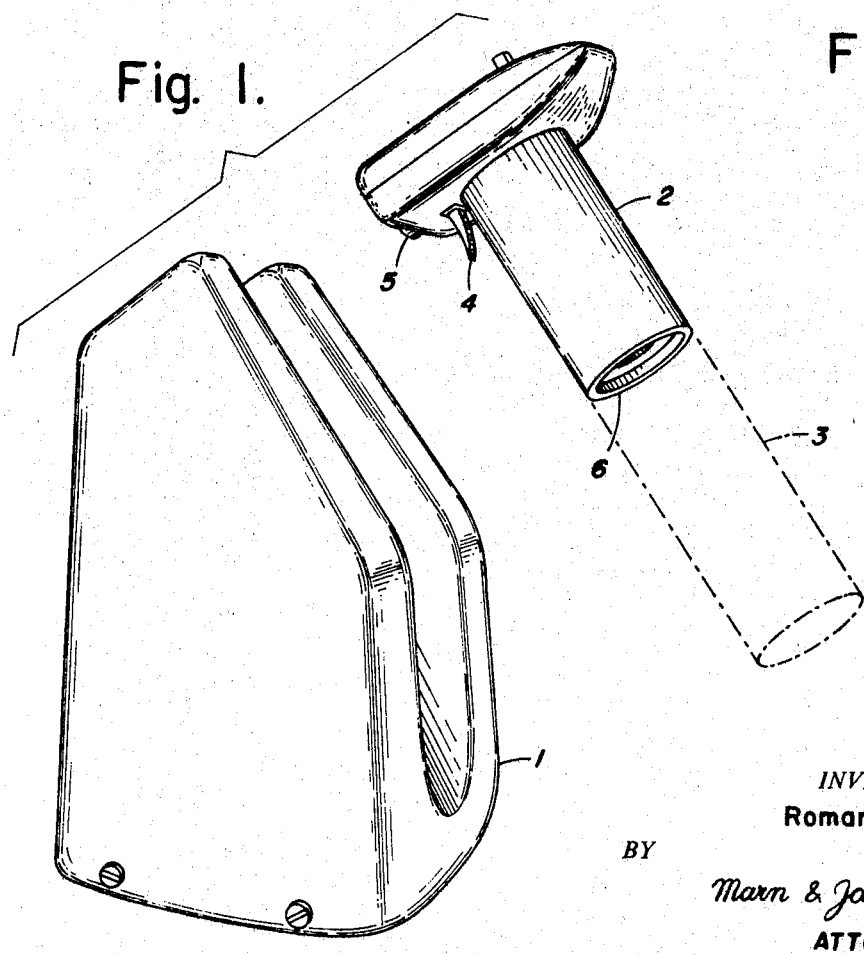
FIG. 1 is a view of the hand-held spray device housing and the spray device charging means housing.

Referring particularly to the drawing, FIG. 1 shows the spray device charging stand housing 1 and the hand-held spray device 2, of the present embodiment of the instant invention, spacially positioned so that their relationship, when the spray device 2 is mounted in the charging stand housing, can easily be appreciated and understood. The hand-held spray device 2 has a fluid container 3 which may, for instance, be an inexpensive plastic bottle mounted into the base 6 thereof via ordinary screw threads mounted in the base of the hand sprayer. However, other equally well-known mounting expedients may be utilized. The hand sprayer housing has the trigger section 4 of spray control means and the end portion 5 of the spray nozzle additionally extending therefrom.

THE SPRAY DEVICE CHARGING STAND

Figure 2A:
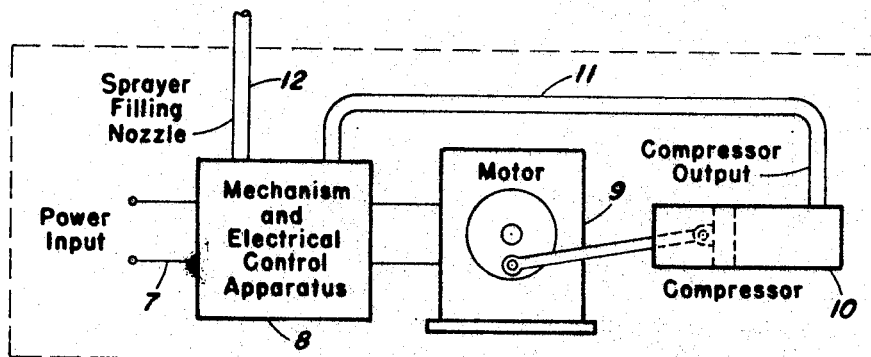
FIGS. 2A and 2B show simplified block diagrams of the spray device charging stand and the hand-held spray device, respectively.

As is shown in FIG. 2A, the spray device charging stand housing 1, indicated by the dashed line, has mounted therein power input terminals 7 which may be an ordinary line cord, the mechanical and electrical control apparatus 8 which is described more fully in conjunction with FIG. 4, a motor 9 having a flywheel thereon, a compressor 10 which is described more fully in connection with FIG. 3, mechanical connection means 11 which connect the output of compressor 10 to the control apparatus 8 and the sprayer air tank filling nozzle 12. Thus, it can be seen that all the heavy apparatus which need not of necessity be mounted within the hand sprayer 2, for the proper operation thereof, is mounted within spray device charging stand housing 1.

The compressor indicated generally as 10 in FIG. 2A is an inexpensive, positive acting device which is of high efficiency and reliability yet is relatively simple to manufacture. This compressor is shown in more detail in FIGS. 3A thru 3C. The compressor 10 comprises a head portion 15, two reed valves 16 and 17, a spacer 18, a cylinder 19 and a piston 20. The head portion 15, the reed valves 16 and 17 and the spacer 18 are rigidly mounted together by four bolts 21 and the peripheral portions of each member are sealed by a suitable sealing compound. The piston 20 is driven by the motor flywheel 22, to which it is connected by piston rod 23, and is sealed within the cylinder by O-rings 24. The cylinder may be vented by suitable vent holes indicated at 25. The spacer 18 has two apertures 26 and 27 therein which are aligned with the cylinder bore. The head 15 has an additional two apertures 28 and 29 therein, one of which (28) is in alignment with aperture 26 of the spacer and the other (29) has a flanged portion which is partially in alignment with aperture 27 of spacer 18. The head 15 has an output fitting 30 mounted in an operative relationship with the aperture 29. The reed valves 16 and 17 which are shown in more detail in FIGS. 3C and 3B, respectively, are made of metal or other suitable materials and may have a thickness of approximately .003 inch. The reed valve 16, as shown in FIG. 3C, has four bolt apertures 34 therein as well as a round aperture 35 which is aligned with the apertures 28 and 26 of the head 15 and the spacer 18, respectively, and the aperture 36 which has the shape of the curved portion of the periphery of a semicircle and is aligned only with part of the flanged portion of the aperture 29 of head 15. The lower reed valve 17, as shown in FIG. 3B has, in addition to the four bolt apertures 34, only a single aperture 38 which is in alignment with aperture 27 of the spacer 18 and the bore of the cylinder 19. The lower reed valve may also be made of metal and may have thickness of about .003 inch.

In operation, the compressor takes in air from the atmosphere during the down stroke of the piston via aperture 28 of head 15, aperture 35 of reed valve 16, aperture 26 of spacer 18 and aperture 38 of reed valve 17. This path is enabled due to the down deformation of reed valves 16 and 17 during the intake stroke of the piston 20. The same down deformation forecloses a path via apertures 29, 36, 27 and 38 because this deformation seals the aperture 36 against the top portion of spacer member 18. The compressed air is expelled via the aperture 38 of reed valve 17, the aperture 27 of the spacer 18, the aperture 36 of the reed valve 16 and the aperture 29 and fitting 30 of head 15, during the up stroke of the piston 20. This path is enabled due to the up deformation of reed valves 16 and 17 during the output stroke of the piston 20. This same up deformation forecloses the path via apertures 38, 26, 35 and 28 because of the slight lateral misalignment of aperture 35 due to this deformation and the sealing of aperture 26 by the up movement of reed valve 17. Thus, it is seen that this invention provides a simple, compact, efficient and positive acting compressor for utilization in the spray device charging stand.

The mechanical and electrical control apparatus, indicated generally as 8 in FIG. 2A, serves as the enabling means for the entire spray device charging apparatus and in addition provides several independent safety features which insure proper operation or the disabling of the device. The mechanical and electrical control apparatus, together with the power connections of the spray device charging stand are shown in more detail in FIG. 4. The mechanical and electrical control apparatus comprises a spring biased starter button 40, a ratchet arm 42, a microswitch 43, a pressure sensitive fluid transfer device 44, and a time and/or heat sensitive relay 45. The starter button 40 is normally biased by spring 46 in the direction shown by the arrow to its off position indicated by the dotted lines at 47. The starter button 40 is mounted on shaft 48 which extends through aperture 49 into the spray device charging stand housing indicated at 1. The shaft 48 is pivotally connected at 50 to the ratchet arm 42 so that regardless of the angle of the ratchet arm 42, shaft 48 will remain horizontal with respect to the aperture 49 and hence be freely movable therein. The ratchet arm 42 is shaped so as to be engageable with the ball connector 51 and has an extended portion 52 which is mounted for engagement by relay 45. The ball connector 51 is mounted on the enabling arm 54 of the microswitch 43, which arm is biased by spring 55 in the direction shown by the arrow to its normally open or off position as indicated by the dashed lines 56. When the microswitch enabling arm 54 is in the closed or on position shown, the circuit from the power source 58 is completed through the microswitch 43 to the motor 9 and the relay 45, are connected in parallel. The relay 45 may be either sensitive to time or sensitive to heat and is preferably sensitive to both. Thus, since the system air tank will normally be fully charged within forty-five to sixty seconds, the relay 45 may be preset to actuate after energization at the expiration of two minutes or, if the pump fails and the device heats up, upon the sensing of a predetermined temperature. The relay 45 has mounted thereon armature 57. When the relay is in the unactuated condition, the armature 57 is in the position shown; however, in the actuated condition the armature 57 will move upward to engage the extend portion 52 of ratchet arm 42. When the armature 57 engages the ratchet arm portion 52, it will tend to rotate the ratchet in the counterclockwise direction about pivot 50 thereby raising the ball-engaging portion of the ratchet sufficiently so that the enabling arm 54 is released and bias spring 55 places the microswitch enabling arm 54 in the off (dashed) position, thus deenergizing the circuit. The fluid transfer device 44 is a pressure sensitive coupling fitting which may be preset to a desired pressure via the screw adjustment shown at 61 of the pressure selection cap 62. When the pressure of the air in this fitting, which is supplied from the compressor to the input nozzle 60, is below the selected level, the piston 63 and the piston rod 64 are in the positions shown and the compressed air will be transmitted from the device via the output filling nozzle 12. When, however, the pressure exceeds the selected value, the piston 63 and the piston rod 64 are forced upward so that the piston rod 64 engages the ratchet arm 42 and tends to rotate it in the counterclockwise direction about pivot 50. The engagement between piston rod 64 and ratchet 42 thereby raise the ball-engaging portion of the ratchet arm sufficiently so that the enabling arm 54 is released and bias spring 55 places the microswitch enabling arm 54 in the off (dashed) position 56, thereby deenergizing the circuit.

In operation, the mechanical and electrical control apparatus is energized when the hand-held spray device 2 is mounted in the spray device charging stand housing 1 thereby overcoming spring bias 46 and depressing the starter button 40. If the piston rod 64 and the armature 57 are both in the nonengaging position shown, the depression of starter button 40 will cause shaft 48 and ratchet arm 42 to move to the right and the ball-engaging portion of ratchet arm 42 will thereby engage ball 51. The engagement of ball 51 by the ratchet arm 42 together with its motion to the right, will overcome the bias of spring 55 thereby placing the microswitch enabling arm 54 in the on position illustrated. This closure of microswitch 43 will complete the circuit from the power source 58 to the motor 9 and the time/heat sensitive relay 45. The energization of the motor 9 causes air from the compressor to be supplied to the fluid transfer device 44 via nozzle 60 and expelled therefrom to the hand-held spray device via filling nozzle 12. At any time that the pressure present in the fluid transfer device 44 exceeds the present value established by the screw adjustment 61 of the pressure selection cap 62, the piston 63 and piston rod 64 present therein will be forced upward thereby into engagement with the ratchet arm 42. As previously specified, such engagement will rotate the ratchet arm 42 about pivot 50 sufficiently so that the ball-engaging portion of the ratchet arm 42 will disengage the ball 51. When the ball 51 is thus disengaged, the microswitch enabling arm 54 will, under the influence of spring bias 55, move to the off (dashed) position 56 thereby deenergizing the motor 9 and hence turning off the compressor. It should be noted that although a mechanical pressure sensing device has been shown, electrical devices such as microswitch utilized in combination with a deformed pressure line could alternatively be used.

When the motor 9 was initially energized by the closure of microswitch 43, the time/heat sensitive relay 45 was also energized thereby and thus the selected time interval of actuation of this device began to run. Thus, after the selected time interval has run or if, in the case of a time and heat sensitive relay, the pump fails and the device begins to heat; armature 57 will, upon the actuation of the relay, move upward to its engaged position with the extended portion 52 of the ratchet arm 42. As set out above, when the armature 57 engages the extended portion 52 of ratchet arm 42, said ratchet arm will rotate sufficiently about pivot 50 so that the ball-engaging portion of the ratchet arm 42 will disengage the ball 51 of enabling arm 54 thereby deenergizing the motor.

It should be noted that to again restart the mechanical and electrical control apparatus after either relay 45 or the fluid transfer device 44 has deenergized the motor circuit, the hand-held spray device must be physically removed from its mounted position in the spray device charging stand so that starter button 40 is released to the off position 47. Thus, operator controlled restarting is necessitated because the pivotal movement of the ratchet arm 42 and the forward motion of the ball 51 prevent the ball-engaging portion of the ratchet arm 42 from re-engaging the ball 51 with the starter button in the depressed position. Thus, it is seen that this invention provides timewise, heatwise and pressurewise control and safety means which renders the operation of the spray device charging stand safe and efficient.

Therefore, the operation of the spray device charging stand as shown in FIG. 2A may be summarized as follows:

(A) The hand-held spray device 2 as shown in FIG. 1 is mounted in the spray device charging stand 2, thereby depressing starter button 40 shown in FIG. 4.

(B) The depressing of starter button 40 actuates the mechanical and electrical control apparatus 8 in the manner explained in detail with regard to FIG. 4.

(C) The actuation of the mechanical and electrical control apparatus 8 energizes the motor 9 thereby causing the compressor 10 to become operational in the manner specified with regard to the description of FIG. 3.

(D) The compressor 10, when operating, supplies air via the mechanical connection means 11 to the fluid transfer device 44 (FIG. 4) of the mechanical and electrical control apparatus which in turn supplies this air to the sprayer filling nozzle 12 as explained above with regard to FIG. 4.

(E) The mechanical and electrical control apparatus deenergizes the motor 9 and hence the compressor 10 when either a predetermined pressure has been reached, a predetermined time interval has elapsed or a selected temperature is sensed.

THE SPRAY DEVICE

Figure 2B:
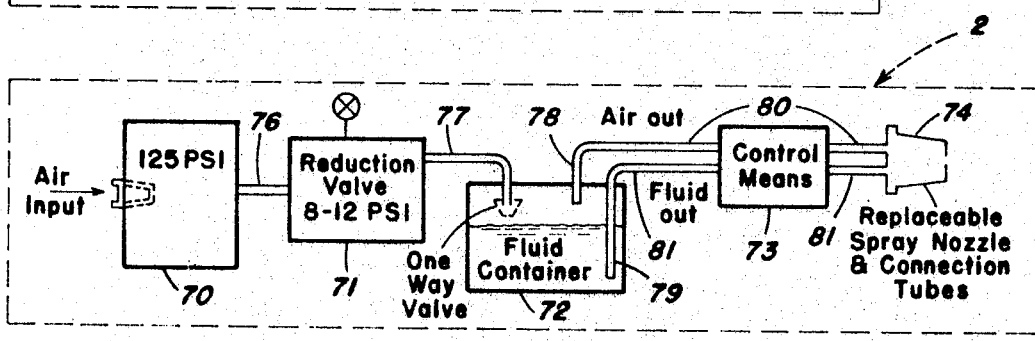

The hand-held spray device 2, as indicated by the dashed line in FIG. 2B, has mounted therein an air reservoir tank 70 which is shown in more detail in FIG. 5, a reduction valve 71 described more fully with regard to FIG. 5, a fluid container 72, spray control means 73 which is more fully described with regard to FIGS. 6A and 6B, a spray nozzle 74 which is shown in more detail in FIG. 6A and various connecting tubes and lines 76–81 discussed below. Thus, it is seen that the hand-held spray device is a self-contained, self-powered unit which is light, convenient, small in size and adapted to be hand held.

The location of the reservoir tank 70, the reduction valve 71, the fluid container 72, and line and tubes 77–79 in an actual embodiment of the instant invention is shown in FIG. 5. The air reservoir tank 70 is shown circular in cross-section having a center channel therein, but may have any appropriate shape. The tank 70 has a one-way female air input nozzle 85 mounted therein which allows air flow therethrough only into the tank. The female air input nozzle 85 is mounted so that when the hand spray device 2 is mounted in the spray device charging stand 1, the input nozzle 85 will mate with the male sprayer filling nozzle 12 extending from the mechanical and electrical control apparatus 8 located in the spray device charging stand 1. The reduction valve 71 is mounted directly into the air reservoir tank so that, in this embodiment, the line 76, shown in FIG. 2B, may be eliminated. The reduction valve 71 is adjustable via adjusting means 86 to reduce the pressure at its input which is normally 125 p.s.i. to an output pressure at conduit 77 of from 8 to 12 p.s.i. The fluid container 72, which may be an ordinary plastic bottle, is screw-mounted at 87 to the base of the air reservoir tank 70 so that its opening is sealed to the channel of the air tank 70. The conduit 77 extends via the channel in the air tank 70 into the fluid container 72, but is maintained above the fluid level indicated at 88. The conduit 77 has a one-way valve 89 mounted on the end portion thereof which extends into the fluid container 72 to prevent feedback into the reduction valve 71. The air line 78 extends through the channel in the air tank 70 to the fluid container 72 and is maintained above the fluid level 88 therein. It should be noted that air line 78 could alternatively be directly connected to the conduit 77 in the form of a T connection so that it would not extend into the fluid container 78 or the air tank channel. The fluid line 79 extends through the air tank channel and into the fluid container 72 to a point substantially below the fluid level 88, near the bottom of the fluid container 72. The air and fluid lines 78 and 79 respectively are terminated in sealing washers 91 and 90, respectively, adapted to be connected to the manifold of the replaceable spray nozzle filtering as specified in more detail with regard to FIGS. 6A and 6B.

The spray control means 73, the spray nozzle 74, and connecting tubes 80 and 81 are shown in detail in FIGS. 6A and 6B. The spray nozzle 74, which may be made of plastic or other suitable materials, is a mixing device which has an output aperture therein properly sized for the viscosity of the fluid to be sprayed. The nozzle 74 is adapted to be held in place by the cover of the hand spray device, but may be easily removed when the cover is removed. The air tube 80 and the fluid tube 81 may be made of rubber or suitable other materials and are placed over the protruding portions 95 of the nozzle 74. The air tube 80 and the fluid tube 81 may then be held in place on their respective protruding portion 95 of the nozzle 74 by a metallic band, which is not shown, in the well-known manner. The other ends of tubes 80 and 81 are connected to the protruding portions 96 of the manifold 97 in a similar manner to that described with regard to their connection to the nozzle 74. The manifold 97 may be made of brass or other suitable materials and is appropriately drilled so that the tubes 80 and 81 are in fluid communication with fluid applied at apertures 98 drilled in the lower portion of the manifold 97. The apertures 98 are countersunk at 99 so that shoulders are provided which will mate with sealing washers 91 and 92 (FIG. 5) of the lines 78 and 79 from the fluid container. The manifold 97 is also adapted to be rigidly held in place by the hand sprayer cover but is easily removable when the cover is removed. The nozzle 74, the air tube 80, the fluid tube 91, and the manifold 97 constitute a readily replaceable and interchangeable nozzle fitting which is preferably supplied in sets with the hand spray device, so that the proper sized nozzle can quickly and easily be inserted into the sprayer device for each fluid of different viscosity which is utilized. Thus, it is seen that a readily replaceable and interchangeable nozzle means has been supplied in accordance with this invention, so that the clogging due to improper nozzle size for the viscosity of fluid utilized is avoided.

The spray control means 73, as shown in FIGS. 6A and 6B, comprises a plate 103, a leaf spring 105, a flow interrupting rod 106, a trigger mechanism 107, and a support housing 108. The trigger mechanism 107 is pivoted on pin member 109 and has a flow interrupting rod 106 mounted in the top portion thereof. The trigger mechanism 107 has the trigger portion 4 thereof extending from the spray device housing for operator actuation and is biased by spring 110 so that the flow interrupting rod 106 normally forecloses the flow in the tubes 80 and 81. The pin member 109 is mounted within the support housing 108 which is fixedly mounted within the hand spray device housing. The plate 103 is fixedly mounted in the spray device housing and is preferably located on the top surface of the air reservoir tank. The plate 103 has the end portions of lines 78 and 79 and the sealing washers 90 and 91 extending therethrough and has leaf spring 105 mounted thereon. The leaf spring 105 is adapted to exert pressure upon fluid tube 81 from the underside of said tube so that when the operator depresses the trigger 107, thereby overcoming the bias of spring 110 and causing the flow interrupting rod to rotate away from the tubes 80 and 81, the air tube 80 will be enabled prior to fluid tube 81; thus preventing clogging.

When a properly filled fluid container 72 and a readily replaceable nozzle means, as previously defined, are in place within the hand spray device, as shown in FIGS. 5 and 6A, the hand sprayer is ready for operation. The hand spray device air reservoir tank is filled to a pressure of 125 p.s.i. when the hand sprayer is placed in the spray device charging stand and the one-way valve 85 is mated with sprayer filling nozzle 12. In the normal case, the spray device may be stored in the charging stand with the nozzle means and fluid container in place and may thereby always be ready for use. When the reservoir tank 70 is pressurized with air at 125 p.s.i., the reduction valve 71 will pressurize line 77 with air at a pressure of from 8–12 p.s.i depending upon the setting or adjusting means 86. The air line 78, the fluid in the container 72, and the fluid line 79 are thereby pressurized and thus fluid and air are present and under pressure in the fluid line 79 and tube 81 and the air line 78 and tube 80 via the respective manifold connections. Both the pressurized air present in 78 and 80 and the pressurized fluid present in 79 and 81 are foreclosed from entering the spray nozzle 74 due to the biased condition of the trigger mechanism 107 and the flow interrupting rod 106. When the hand spray device is to be used, said device is removed from the spray device charging stand, aimed at the point of application, and the trigger portion 4 of the trigger mechanism 107 is depressed. Upon the depression of trigger portion 4, the bias of spring 110 is overcome and the flow interrupting rod 106 begins to rotate away from the biased position in which it forecloses fluid and air flow to the nozzle 74. Pressurized air will immediately flow into the nozzle but the pressurized fluid in tube 81 will remain foreclosed until the flow interrupting rod 106 has rotated to a position where leaf spring 105 can no longer urge tube 81 against said rod. Thus, because the flow of pressurized air precedes the flow of fluid, when the device is initially utilized, and further because the flow of air terminates subsequent to the flow of fluid, when the trigger mechanism 107 is released; the chance of clogging the nozzle, due to the dried fluid residue remaining therein, is substantially reduced. When the operator has finished with the hand spray device, it may be returned to the spray device charging stand for further charging, the fluid container may be refilled, or the fluid may be changed and another spray nozzle fitting inserted. The spray nozzle fitting is removed merely by removing the spray device cover, depressing the trigger portion 4, removing tubes 80 and 81 from under rod 106 and lifting off the fitting. A new spray nozzle fitting is mounted in the spray device by reversing the above procedure.

Thus, it is seen that a self-contained, self-powered spray device which is light, convenient, small in size, adapted to be hand held, and compatible with fluids of various viscosities has been provided by the present invention. Furthermore, a positive acting, simple, but highly efficient compressor means has been provided by the present invention for utilization therein and for other uses where the disclosed compressor means is found desirable. In addition, the present invention has provided a control and safety means for a compressor which is highly reliable and simple yet efficiently ensures proper and safe operation. Finally, a replaceable and interchangeable nozzle means has been provided by the present invention which allows the spray device of the instant invention and similar other devices to be utilized with fluids of varying viscosity, without the inherent problem of clogging normally present therewith.

While the invention has been described in connection with a specific embodiment thereof, it will be understood that many modifications will be readily apparent to one of ordinary skill in the art; and that this application is intended to cover any adaptations or variations thereof. Therefore, it is manifestly intended that this invention be only limited by the claims and the equivalents thereof.

What is claimed is:

1. Control apparatus for a motor-driven compressor system comprising:

motor actuating means having first and second portions, said first portion adapted to be depressed to energize the compressor;

ratchet arm means having an engaging portion thereon, said ratchet arm means being pivotally connected to said second portion of said motor actuating means;

switch means connected to energize said motor having enabling arm means controlling the state thereof, said enabling arm means having an engageable portion thereon, said enabling arm means being normally biased to the off switch position, said ratchet arm means engaging portion being operable to engage said enabling arm means engageable portion when said motor actuating means is depressed to thereby close said switch means and energize said motor; and sensing means mounted in an operative relationship with said ratchet arm means, said sensing means responding to a selected condition to break the engagement between said ratchet arm means and said enabling arm means to thereby open said switch.

2. The apparatus of claim 1 wherein said sensing means comprises relay means which is energized by said switch and is sensitive to at least time.

3. The apparatus of claim 1 wherein said sensing means comprises a pressure sensitive fitting connected to said compressor, said fitting being responsive to a pressure exceeding a selected value.

4. The apparatus of claim 2, wherein said sensing means additionally comprises a pressure sensitive fitting connected to said compressor, said fitting being responsive to a pressure exceeding a selected value.

5. The apparatus of claim 1 wherein said sensing means comprises relay means which is energized by said switch means and is sensitive to heat.

References Cited

UNITED STATES PATENTS

| | | | |
|---|---|---|---|
| 2,137,221 | 11/1938 | Aikman | 230—6 |
| 2,935,248 | 5/1960 | Gerteis | 230—231 |
| 3,066,856 | 12/1962 | Frank | 230—231 |
| 3,102,677 | 9/1963 | Evans et al. | 230—6 |

ROBERT M. WALKER, Primary Examiner

U.S. Cl. X.R.

318—452; 417—33, 44